US012781660B2

(12) United States Patent
Gautier

(10) Patent No.: US 12,781,660 B2
(45) Date of Patent: Nov. 3, 2026

(54) V-TYPE INTERNAL COMBUSTION ENGINE

(71) Applicant: Liebherr-Components Colmar SAS, Colmar Cedex (FR)

(72) Inventor: Stephan Gautier, Cernay (FR)

(73) Assignee: LIEBHERR-COMPONENTS COLMAR SAS, Colmar Cedex (FR)

( * ) Notice: Subject to any disclaimer, the term of this patent is extended or adjusted under 35 U.S.C. 154(b) by 0 days.

(21) Appl. No.: 19/172,022

(22) Filed: Apr. 7, 2025

(65) Prior Publication Data

US 2025/0320829 A1 Oct. 16, 2025

(30) Foreign Application Priority Data

Apr. 12, 2024 (DE) ..................... 10 2024 110 314.0

(51) Int. Cl.
*F01N 13/10* (2010.01)
*F02B 29/04* (2006.01)

(52) U.S. Cl.
CPC ........ *F01N 13/107* (2013.01); *F02B 29/0475* (2013.01); *F05D 2220/40* (2013.01)

(58) Field of Classification Search
CPC ................ F01N 13/107; F02B 29/0475; F02B 29/0406; F02B 29/0412; F02B 29/04; F05D 2220/40; Y02T 10/12
See application file for complete search history.

(56) References Cited

U.S. PATENT DOCUMENTS

| | | | | |
|---|---|---|---|---|
| 10,047,664 | B2 * | 8/2018 | Nishiura | F01N 13/107 |
| 10,100,786 | B2 * | 10/2018 | Bremmer | F02M 26/22 |
| 10,781,743 | B2 * | 9/2020 | Uchibori | F02B 37/00 |
| 10,982,589 | B1 | 4/2021 | Mendoza et al. | |
| 2002/0056444 | A1 * | 5/2002 | Chou | F02B 75/22 123/562 |
| 2016/0090902 | A1 | 3/2016 | Svihla et al. | |

FOREIGN PATENT DOCUMENTS

| | | | | | |
|---|---|---|---|---|---|
| DE | 969328 | C | | 5/1958 | |
| DE | 2006064 | A1 | | 8/1971 | |
| EP | 2683925 | B1 | * | 11/2014 | F02B 37/013 |
| GB | 2576883 | A | * | 3/2020 | F02B 67/10 |

OTHER PUBLICATIONS

European Patent Office, Extended European Search Report Issued in Application No. 25168005.4, Oct. 15, 2025, Germany, 7 pages.

* cited by examiner

*Primary Examiner* — Jesse S Bogue
(74) *Attorney, Agent, or Firm* — McCoy Russell LLP

(57) ABSTRACT

The present disclosure provides a V-type internal combustion engine comprising a first cylinder bank and a second cylinder bank, each cylinder bank comprising a plurality of cylinders arranged in an axial direction of the V-type internal combustion engine, a first turbocharger arrangement for providing charged air to the first cylinder bank and a second turbocharger arrangement for providing charged air to the second cylinder bank, the first turbocharger arrangement comprising at least one turbocharger and a first charge air cooler, and the second turbocharger arrangement comprising at least one turbocharger and a second charge air cooler, wherein the first charge air cooler is positioned on a first side of the first cylinder bank with respect to the axial direction and the second charge air cooler is positioned on an opposing, second side of the second cylinder bank with respect to the axial direction.

19 Claims, 3 Drawing Sheets

Invention

Invention

V-TYPE INTERNAL COMBUSTION ENGINE

CROSS REFERENCE TO RELATED APPLICATION

The present application claims priority to German Patent Application No. 10 2024 110 314.0 filed on Apr. 12, 2024. The entire contents of the above-listed application are hereby incorporated by reference for all purposes.

TECHNICAL FIELD

The present disclosure relates to a V-type internal combustion engine comprising a first cylinder bank and a second cylinder bank, each cylinder bank comprising a plurality of cylinders arranged in an axial direction of the V-type internal combustion engine. In particular, the present disclosure relates to a turbo-charged internal combustion engine of this type.

BACKGROUND

Depending on the application, turbo-charged internal combustion engines require different numbers of turbochargers. For example, for high altitude applications, a higher number of turbochargers is required than for low altitude applications of the same engine. In prior art solutions, this leads to a lot of different designs of charge air pipes after compressor to be able to move the charge air to the charge air cooler. The multitude of different designs also leads to an increase in material costs for internal combustion engines.

SUMMARY

Up to now, the position of different turbochargers on an internal combustion engine is non-standardized. This means that the architecture of the charge air ducts is different depending on the configuration of the engine, such as the number of cylinders and the number of turbochargers.

Some attempts have been made to standardize the charge air architecture to allow the same position of turbochargers to be used for different cylinder numbers, such as for V12-V16-V20 engines. However, there is still a large number of different parts which are required.

The object of the present disclosure is therefore to provide an improved V-type internal combustion engine and in particular to reduce the number of different parts required for the turbocharger arrangement.

This object is solved by the V-type internal combustion engine as described herein.

The present disclosure provides a V-type internal combustion engine comprising a first cylinder bank and a second cylinder bank, each cylinder bank comprising a plurality of cylinders arranged in an axial direction of the V-type internal combustion engine, a first turbocharger arrangement for providing charged air to the first cylinder bank, i.e. to all cylinders of the first cylinder bank, and a second turbocharger arrangement for providing charged air to the second cylinder bank, i.e. to all the cylinders of the second cylinder bank, the first turbocharger arrangement comprising at least one turbocharger and a first charge air cooler, and the second turbocharger arrangement comprising at least one turbocharger and a second charge air cooler. The disclosure is characterized in that the first charge air cooler is positioned on a first side of the first cylinder bank with respect to the axial direction and the second charge air cooler is positioned on an opposing, second side of the second cylinder bank with respect to the axial direction.

The inventor of the present disclosure has realized that in the standard prior art configuration of a turbocharged V-type engine, where the charge air coolers for the first and second cylinder bank (the first and second cylinder bank also referred to as A-side and B-side in the following) are arranged on the same axial side of the engine, requires different parts for the charge air ducts between A-side and B-side. This can be improved with the present disclosure, where the charge air coolers for the first and second cylinder bank are arranged on opposite axial sides of the engine, a concept also referred to as "diagonal concept" because the charge air coolers have a diagonal position on the engine.

Thanks to this specific engine architecture associated to the location of the charge air coolers, the design diversity of engine parts such as charge air pipes, charge air pipe supports, turbochargers, compensators, air manifolds, exhaust manifolds and piping can be reduced. Thereby, the diagonal charge air loop concept will also improve the material costs for manufacturing engines.

In an embodiment of the present disclosure, the first turbocharger arrangement and the second turbocharger arrangement are single stage-turbocharger arrangements, i.e. the intake air is only compressed in a single compressor stage and the turbocharger arrangement does not comprise a plurality of turbochargers operating in series. Each turbocharger arrangement may however comprise a plurality of turbochargers operating in parallel.

In an embodiment of the present disclosure, the V-type internal combustion engine comprises a first charge air piping arrangement connecting the at least one turbocharger of the first turbocharger arrangement to the first charge air cooler and a second charge air piping arrangement connecting the at least one turbocharger of the second turbocharger arrangement to the second charge air cooler, wherein the direction of charged air flow from the at least one turbocharger of the first turbocharger arrangement to the first charge air cooler is opposite to the direction of charged air flow from the at least one turbocharger of the second turbocharger arrangement to the second charge air cooler.

In an embodiment of the present disclosure, an outlet side of the first and second charge air coolers is directly connected to the air inlets of the cylinders of the respective cylinder bank by a first and second charge air manifold, respectively.

In an embodiment of the present disclosure, the V-type internal combustion engine comprises a first charge air manifold connecting the first charge air cooler with the cylinders of the first cylinder bank and a second charge manifold connecting the second charge air cooler with the cylinders of the second cylinder bank, wherein the direction of charged air flow from the first charge air cooler to the cylinders of the first cylinder bank is opposite to the direction of charged air flow from the second charge air cooler to the cylinders of the second cylinder bank. Thereby, the diagonal concepts is also transferred to the charge air manifold, allowing the use of the same parts for the first and second cylinder bank for the charge air manifolds.

In an embodiment of the present disclosure, the first charge air manifold connects a single charge air outlet of the first charge air cooler with all the cylinders of the first cylinder bank and the second charge air manifold connects a single charge air outlet of the second charge air cooler with all the cylinders of the second cylinder bank.

In an embodiment of the present disclosure, the first charge air manifold and the second charge air manifold are each provided by a charge air pipe extending in the axial direction from the respective charge air cooler along the respective cylinder bank, with charge air ducts branching off from the charge air pipe to air inlets of the cylinders.

In an embodiment of the present disclosure, the V-type internal combustion engine comprises a first blow by filter of the first cylinder bank and a second blow-by filter of the second cylinder bank, wherein the first blow-by filter is positioned on a second side of the first cylinder bank with respect to the axial direction and the second blow-by filter is positioned on an opposing, first side of the second cylinder bank with respect to the axial direction. Thereby, the diagonal concepts is also transferred to the blow-by filters, making room for the diagonal arrangement of the chare air coolers. Further, it will allow the use of the same parts for the first and second cylinder bank for the blow-by filter and its connection ducts to the air or exhaust gas system. The same part includes that the parts have the same shape, same dimension, and are made of the same material.

In an embodiment of the present disclosure, the first blow-by filter of the first cylinder bank is arranged at the same axial position as the second charge air cooler of the second cylinder bank and the second blow-by filter of the second cylinder bank is arranged at the same axial position as the first charge air cooler of the first cylinder bank.

In an embodiment of the present disclosure, the first charge air cooler is arranged axially next to a last cylinder of the first cylinder bank on the first side of the first cylinder bank and the second charge air cooler is arranged next to a last cylinder of the second cylinder bank on the second side of the second cylinder bank.

In an embodiment of the present disclosure, the engine comprises a flywheel housing on the first axial side and an aggregate support on the second axial side.

In an embodiment of the present disclosure, the first charge air cooler is mounted on the flywheel housing and the second charge air cooler is mounted on the aggregate support.

In an embodiment of the present disclosure, the same parts are used for at least some components of the first and second turbocharger arrangement, optionally including at least one or more of the same charge air piping, charge air piping supports, turbochargers, charge air coolers and charge air manifolds.

In an embodiment of the present disclosure, the same parts are used for the exhaust gas manifold of the first and second cylinder bank.

In an embodiment of the present disclosure, the V-type internal combustion engine comprises a cooling fluid pump for operating the first and second charge air coolers, wherein the cooling fluid pump is optionally arranged on the second axial side, and in particular mounted on and aggregate support of the engine, wherein a cooling fluid circuit of the engine comprises a cooling fluid line connecting the cooling fluid pump and the first charge air cooler across the engine axial extension. This arrangement adapts the layout of the cooling circuit to the diagonal arrangement of the charge air coolers.

In an embodiment of the present disclosure, the V-type internal combustion engine comprises at least 12 cylinders, and optionally 12, 16 or 20 cylinders.

In an embodiment of the present disclosure, at least one of the turbocharger arrangements comprises at least two turbochargers. In an embodiment of the present disclosure each turbocharger arrangement comprises at least two turbochargers.

In an embodiment of the present disclosure, all the turbochargers of the first turbocharger arrangement operate in parallel and optionally the outlet sides of all the turbochargers of the first turbocharger arrangement are fluidly connected for commonly providing charged air to all the cylinders of the first cylinder bank. In particular, the outlet sides of all the turbochargers of the first turbocharger arrangement are fluidly connected on an inlet side of the first charge air cooler.

In an embodiment of the present disclosure, all the turbochargers of the second turbocharger arrangement operate in parallel and the outlet sides of all the turbochargers of the second turbocharger arrangement are fluidly connected for commonly providing charged air to all the cylinders of the second cylinder bank. In particular, the outlet sides of all the turbochargers of the second turbocharger arrangement are fluidly connected on an inlet side of the second charge air cooler.

In an embodiment of the present disclosure, the first and the second turbocharger arrangement are fluidly separated on the high pressure side and/or comprise the same number of turbochargers.

In an embodiment of the present disclosure, the first and the second turbocharger arrangement are fluidly connected on the high pressure side and/or comprise the a different number of turbochargers.

In an embodiment of the present disclosure, the first and the second turbocharger arrangements are arranged on top of the first and second cylinder bank, respectively. The diagonal concept is particularly designed for such a position of the turbocharger arrangements.

In an embodiment of the present disclosure, the engine is a Diesel engine.

The present disclosure further comprises a machine comprising the V-type internal combustion engine as described above.

In an embodiment of the present disclosure, the machine is a movable machine and the engine is used for propulsion of the movable machine.

In an embodiment of the present disclosure, the engine drives a generator.

The present disclosure will now be described with respect to example embodiments and drawings.

DETAILED DESCRIPTION

Figures 1, 2:
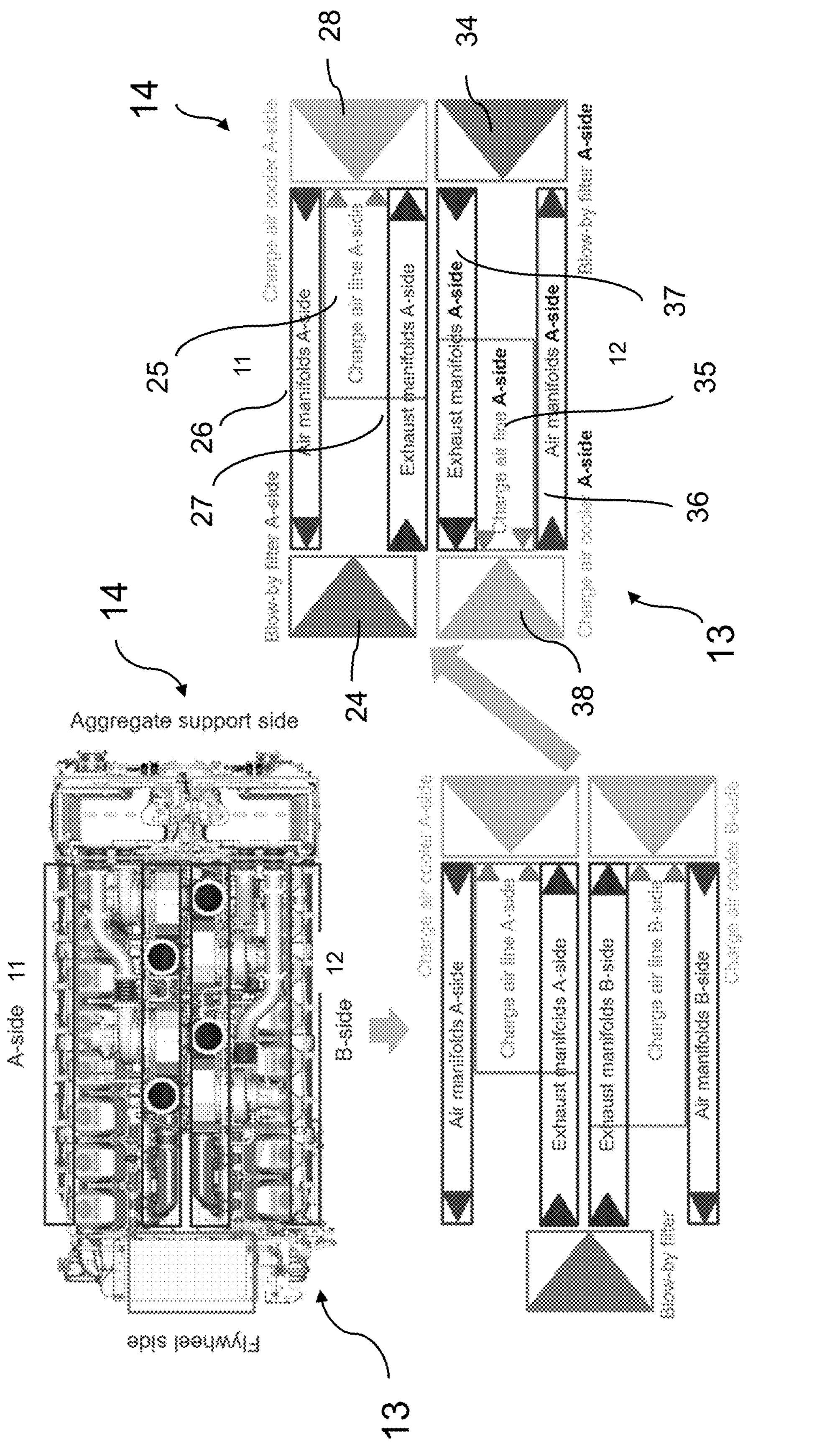
Prior Art Fig. 1
FIG. 1: a prior art configuration of the turbocharger arrangements of a V-type internal combustion engine.
FIG. 2: a conceptional drawing showing an embodiment of the present disclosure.
Figure 3:
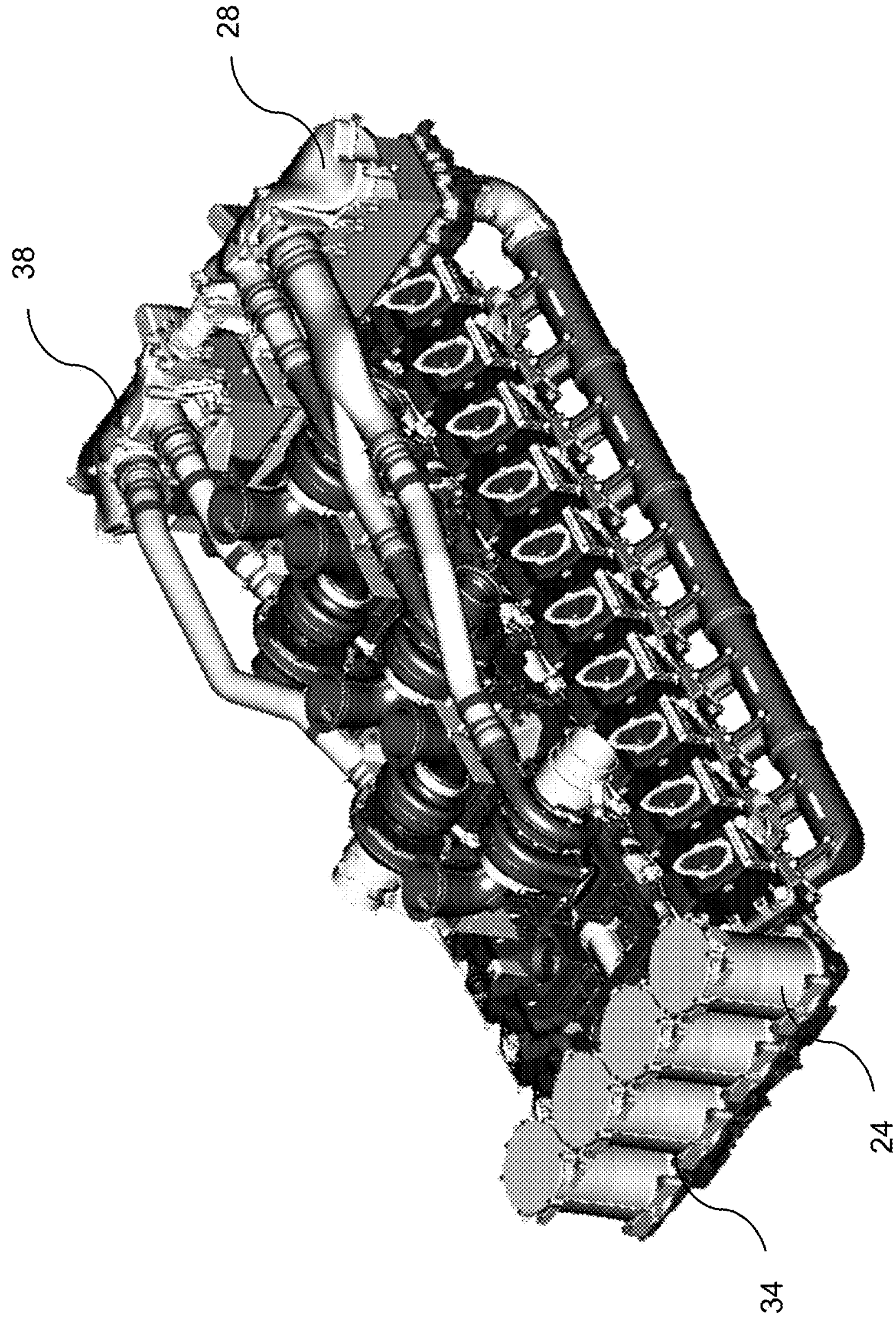
Prior Art Fig. 3
FIG. 3: a perspective drawing showing a prior art configuration

FIGS. 1 and 3 show a prior art configuration of the turbocharger arrangements of a V-type combustion engine.

In this prior art configuration, the charge air coolers for the turbocharger arrangement for the first and second cylinder bank, also called A-side 11 and B-side 12 in the present application, are arranged on the same axial side of the engine, and in particular on the aggregate support side of the engine. Further, the blow by filters for the two cylinder banks are equally arranged axially opposite to the charge air coolers on the same axial side, which is the flywheel side of the engine. Consequently, the charge air ducts leading from the turbochargers to the charge air coolers, as well as the charge air manifolds leading from the charge air coolers to the cylinders, run in parallel for the A-side and the B-side in the prior art configuration.

The inventor of the present disclosure has realized that due to this design, different parts have to be used for the turbocharger arrangements for the A-side and the B-side, and that this problem can be avoided by choosing a different configuration of the charge air coolers.

Figure 4:
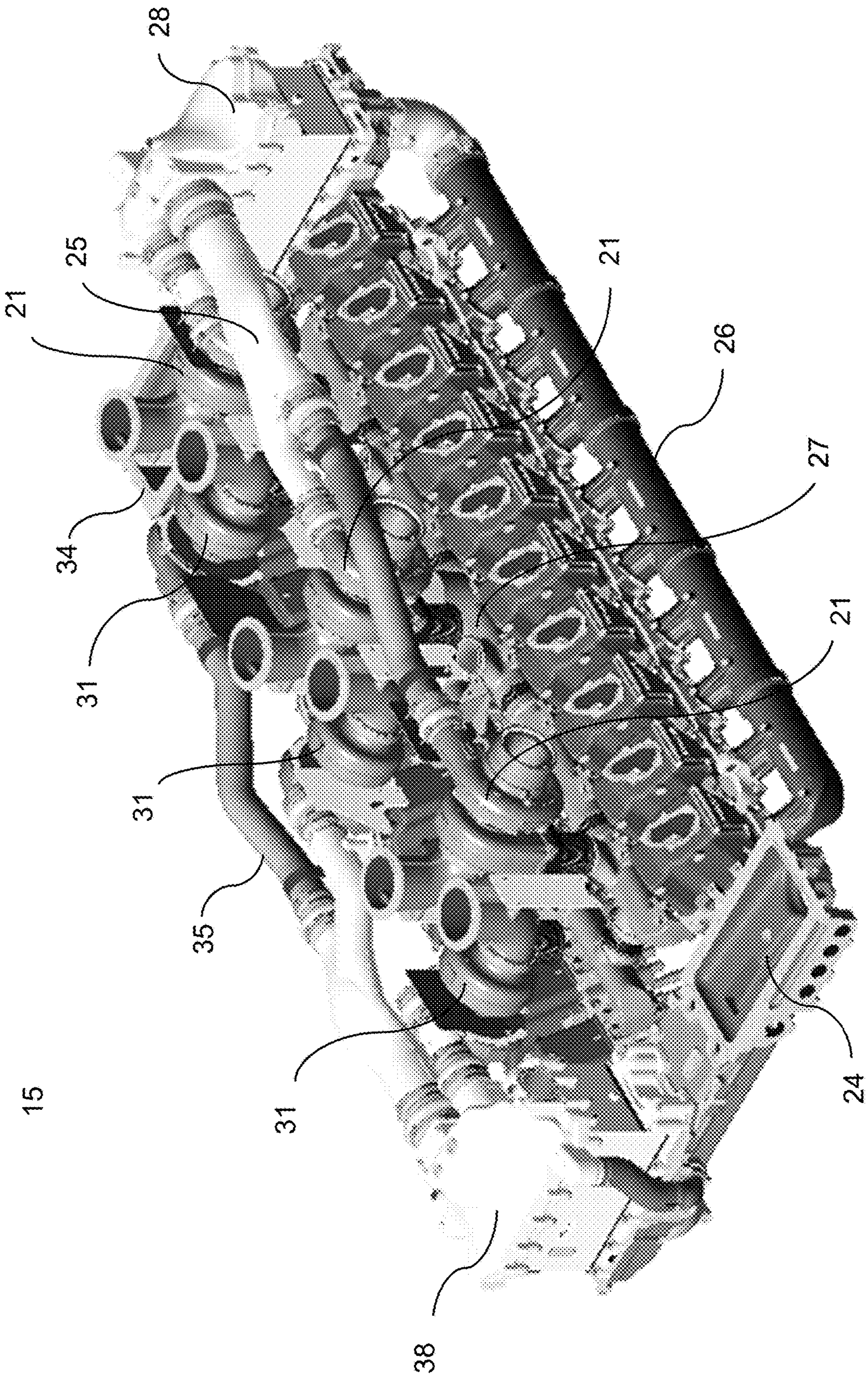
FIG. 4: a perspective drawing showing an embodiment of the present disclosure.

FIGS. 2 and 4 show embodiments of the inventive diagonal concept, where the charge air cooler 28 for the A-side 11 and the charge air cooler 38 for the B-side 12 are arranged on opposite axial sides of the engine, i.e. the charge air cooler 28 for the A-side 11 is arranged on the aggregate support side, and the charge air cooler 38 for the B-side is arranged on the flywheel side 13 (or vice versa).

Due to this diagonal positioning of the charge air coolers, the charge air ducts 25 and 35 for the A-side 11 and B-side 12 run in opposite directions from the compressors of the turbo chargers 21 and 31 to the charge air cooler 28 and 38, respectively. Further, the charge air manifolds 26 and 36 of the A-side 11 and B-side 12 equally run from the respective charge air coolers 28 and 38 to the cylinders of the respective cylinder bank of the A-side and B-side 12 in opposite directions.

Due to the symmetry of the engine, by this diagonal arrangement, the same parts can be used for the charge air ducts and the charge air manifolds for the A-side 11 and the B-side 12, indicated in FIG. 2 by referring to both manifolds as manifolds of the A-side. Further, the same parts can also be used for the charge air coolers 28 and 38.

Further, due to the diagonal configuration, the same parts can also be used for the blow by filters 24 and 34 of the two cylinder banks, as well as for the exhaust gas manifolds 27 and 37.

FIG. 4 thereby shows the configuration of a V-type engine where each cylinder bank has a turbocharger arrangement comprising a plurality of turbochargers 21 and 31 operating in parallel. In particular, the turbines of the turbochargers 31 are operated by the exhaust gas exiting the cylinders of the B-side 12 cylinder bank and the turbochargers 21 are operated by the exhaust gas exiting the cylinders of the A-side 11.

As can be seen from FIG. 4 for the cylinder block having the turbochargers 21, there is an exhaust gas manifold 27 connecting the exhaust gas outlets of the cylinders of each bank between each other, extending along the axial direction of the respective cylinder bank, to which the inlets of the turbines of the turbo chargers 21 are respectively connected.

Further, each of the turbochargers 21 is connected by charge air ducts 25 to the charge air cooler 28, such that the compressed air generated by the turbo chargers flows to the charge air cooler 28, with the turbo chargers 21 operating in parallel. From the charge air cooler 28 or 38, the cooled charge air flows via the charge air manifold 26 or 36 to the cylinders of the respective cylinder bank.

Further, FIG. 4 shows also the mounting structure for the blow by filter 24, which is not shown as such in FIG. 4. The blow by filters filter out hydrocarbons from the blow by of the crank case of the respective cylinder bank, with the filtered blow by being recirculated into the charge air duct 26 or the exhaust gas manifold 27.

Exactly the same configuration is also present on the B-side 12, where the same components as on the A-side 11 can be used due to the diagonal concept.

Further, the diagonal concept uses a new pipeline to bring cooling liquid from a water pump arranged on the aggregate support side 14 to the charge air cooler arranged on the flywheel side. The water pump and pipeline is not shown in the figures.

In the embodiment shown in FIG. 4, the same number of turbo chargers is used for the A-side and B-side. Therefore, the turbo charger arrangement of the two cylinder banks can be fluidly separated. The same is true for the exhaust gas manifolds.

In contrast, for a configuration where an odd number of turbochargers is provided, additional interconnections between the charge air systems of the A-side and the B-side are required to balance the air flow between the A-side and the B-side because different numbers of turbochargers are provided for each side. Further, there is also the requirement of an interconnection for the exhaust gas duct for operating the turbo charger systems. However, such additional components have a low impact on the quantity and design diversity of new parts needed in the diagonal charge air loop architecture of the present disclosure.

The main new topic brought by the disclosure is the different location of charge air cooler on the top of the engine. While placing a charge air cooler on the flywheel side, and the other charge air cooler on the aggregate support side, it is possible to reuse with a diagonal symmetry, the same parts (charge air pipe, charge air pipe support, turbocharger, compensator, air manifold, exhaust manifold, turbocharger cooling) from A-side to B-side.

The diagonal charge air loop architecture has allowed to:

1. Improve the engine configuration regarding the charge air loop.
2. Decrease the number of parts needed for the charge air line. Each parts from engine A-side can be used on engine B-side→cost reduction
3. Standardize the complete charge air line architecture by using same parts on B-side and A-side.→cost reduction.

In the embodiment shown in FIG. 4, relative positioning of the various components is illustrated, including that if shown directly contacting each other, or directly coupled (e.g., via a passage), then such elements may be referred to as such. Similarly, elements shown contiguous or adjacent to one another may be referred to as such. Elements positioned apart from each other with only a space there-between and no other components may be referred to as such. As yet another example, elements shown above/below one another, at opposite sides to one another, or to the left/right of one another may be referred to as such, relative to one another. Further, as shown in the figures, a topmost element or point of element may be referred to as a "top" of the component and a bottommost element or point of the element may be referred to as a "bottom" of the component, in at least one example.

The invention claimed is:

1. A V-type internal combustion engine comprising:

a first cylinder bank and a second cylinder bank, each cylinder bank comprising a plurality of cylinders arranged in an axial direction of the V-type internal combustion engine, a first turbocharger arrangement for providing charged air to the first cylinder bank and a second turbocharger arrangement for providing charged air to the second cylinder bank, the first turbocharger arrangement comprising at least one turbocharger and a first charge air cooler, and the second turbocharger arrangement comprising at least one turbocharger and a second charge air cooler, and a first charge air manifold connecting a single charge air outlet of the first charge air cooler with all the cylinders of the first cylinder bank and a second charge manifold connecting a single charge air outlet of the second charge air cooler with all the cylinders of the second cylinder bank, wherein the first charge air cooler is positioned on a first side of the first cylinder bank with respect to the axial direction and the second charge air cooler is positioned on an opposing, second side of the second cylinder bank with respect to the axial direction, and the direction of charged air flow from the first charge air cooler to the cylinders of the first cylinder bank is opposite to the direction of charged air flow from the second charge air cooler to the cylinders of the second cylinder bank.

2. The V-type internal combustion engine of claim 1, comprising a first charge air piping arrangement connecting the at least one turbocharger of the first turbocharger arrangement to the first charge air cooler and a second charge air piping arrangement connecting the at least one turbocharger of the second turbocharger arrangement to the second charge air cooler, wherein the direction of charged air flow from the at least one turbocharger of the first turbocharger arrangement to the first charge air cooler is opposite to the direction of charged air flow from the at least one turbocharger of the second turbocharger arrangement to the second charge air cooler.

3. The V-type internal combustion engine of claim 1, wherein the engine comprises a flywheel housing on the first axial side and an aggregate support on the second axial side.

4. The V-type internal combustion engine of claim 1, wherein the same parts are used for at least some components of the first and second turbocharger arrangement.

5. The V-type internal combustion engine of claim 1, wherein the same parts are used for the exhaust gas manifold of the first and second cylinder bank.

6. The V-type internal combustion engine of claim 1, comprising a cooling fluid pump for operating the first and second charge air coolers.

7. The V-type internal combustion engine of claim 1, comprising at least 12 cylinders.

8. The V-type internal combustion engine of claim 1, each turbocharger arrangement comprising at least two turbochargers.

9. The V-type internal combustion engine of claim 1, wherein the first and the second turbocharger arrangement are fluidly separated on a high pressure side and/or comprise the same number of turbochargers.

10. The V-type internal combustion engine of claim 1, wherein the first and the second turbocharger arrangement are fluidly connected on a high pressure side and/or comprise a different number of turbochargers.

11. The V-type internal combustion engine of claim 1, wherein the first and the second turbocharger arrangements are arranged on top of the first and second cylinder bank, respectively.

12. A machine comprising the V-type internal combustion engine of claim 1, wherein the machine is a movable machine and the engine is used for propulsion of the movable machine or wherein the engine drives a generator.

13. The V-type internal combustion engine of claim 4, wherein the same parts include at least one or more of the same charge air piping, charge air piping supports, turbochargers, charge air coolers and charge air manifolds.

14. The V-type internal combustion engine of claim 6, wherein the cooling fluid pump is arranged on the second axial side.

15. The V-type internal combustion engine of claim 7, comprising exactly 12 cylinders.

16. The V-type internal combustion engine of claim 7, comprising exactly 16 or 20 cylinders.

17. A V-type internal combustion engine comprising:

a first cylinder bank and a second cylinder bank, each cylinder bank comprising a plurality of cylinders arranged in an axial direction of the V-type internal combustion engine, a first turbocharger arrangement for providing charged air to the first cylinder bank and a second turbocharger arrangement for providing charged air to the second cylinder bank, the first turbocharger arrangement comprising at least one turbocharger and a first charge air cooler, and the second turbocharger arrangement comprising at least one turbocharger and a second charge air cooler, and a first blow by filter of the first cylinder bank and a second blow-by filter of the second cylinder bank, wherein the first charge air cooler is positioned on a first side of the first cylinder bank with respect to the axial direction and the second charge air cooler is positioned on an opposing, second side of the second cylinder bank with respect to the axial direction, and the first blow-by filter is positioned on the second side of the first cylinder bank with respect to the axial direction and the second blow-by filter is positioned on the opposing, first side of the second cylinder bank with respect to the axial direction.

18. A V-type internal combustion engine comprising:

a first cylinder bank and a second cylinder bank, each cylinder bank comprising a plurality of cylinders arranged in an axial direction of the V-type internal combustion engine, a first turbocharger arrangement for providing charged air to the first cylinder bank and a second turbocharger arrangement for providing charged air to the second cylinder bank, the first turbocharger arrangement comprising at least one turbocharger and a first charge air cooler, and the second turbocharger arrangement comprising at least one turbocharger and a second charge air cooler, and a flywheel housing on the first axial side and an aggregate support on the second axial side, wherein the first charge air cooler is positioned on a first side of the first cylinder bank with respect to the axial direction and the second charge air cooler is positioned on an opposing, second side of the second cylinder bank with respect to the axial direction, and wherein the first charge air cooler is mounted on the flywheel housing and the second charge air cooler is mounted on the aggregate support.

19. A V-type internal combustion engine comprising:

a first cylinder bank and a second cylinder bank, each cylinder bank comprising a plurality of cylinders arranged in an axial direction of the V-type internal combustion engine, a first turbocharger arrangement for providing charged air to the first cylinder bank and a second turbocharger arrangement for providing charged air to the second cylinder bank, the first turbocharger arrangement comprising at least one turbocharger and a first charge air cooler, and the second turbocharger arrangement comprising at least one turbocharger and a second charge air cooler, and a cooling fluid pump for operating the first and second charge air coolers, wherein the first charge air cooler is positioned on a first side of the first cylinder bank with respect to the axial direction and the second charge air cooler is positioned on an opposing, second side of the second cylinder bank with respect to the axial direction, the cooling fluid pump is arranged on the second axial side, and the cooling fluid pump is mounted on and aggregate support of the engine, wherein a cooling fluid circuit of the engine comprises a cooling fluid line connecting the cooling fluid pump and the first charge air cooler across the engine axial extension.

* * * * *